United States Patent
Wu (10) Patent No.: US 9,859,726 B2
(45) Date of Patent: Jan. 2, 2018

(54) DETECTION CIRCUIT AND METHOD FOR STARTING CHARGING

(71) Applicant: GUANG DONG OPPO MOBILE TELECOMMUNICATIONS CORP., LTD., Dongguan (CN)

(72) Inventor: Kewei Wu, Dongguan (CN)

(73) Assignee: GUANG DONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 15/114,430

(22) PCT Filed: May 8, 2014

(86) PCT No.: PCT/CN2014/077014
§ 371 (c)(1),
(2) Date: Jul. 27, 2016

(87) PCT Pub. No.: WO2015/113335
PCT Pub. Date: Aug. 6, 2015

(65) Prior Publication Data
US 2017/0085102 A1  Mar. 23, 2017

(30) Foreign Application Priority Data

Jan. 28, 2014  (CN) .......................... 2014 1 0042603

(51) Int. Cl.
*H02J 7/00* (2006.01)
(52) U.S. Cl.
CPC .......... *H02J 7/0036* (2013.01); *H02J 7/0045* (2013.01); *H02J 7/0052* (2013.01)
(58) Field of Classification Search
CPC ...... H02J 7/0026; H02J 7/0029; H02J 7/0034; H02J 7/0045; H02J 7/0054; H02J 7/027;
(Continued)

(56) References Cited

U.S. PATENT DOCUMENTS

| 5,596,258 A | 1/1997 | Kimura et al. |
| 2011/0193532 A1* | 8/2011 | Iwanaga ................ B60K 6/445 320/163 |

(Continued)

FOREIGN PATENT DOCUMENTS

| CN | 1633193 | 6/2005 |
| CN | 1649231 | 8/2005 |

(Continued)

OTHER PUBLICATIONS

International Searching Authority, International Search Report for PCT/CN2014/077014 Sep. 26, 2014.

(Continued)

*Primary Examiner* — Drew A Dunn
*Assistant Examiner* — Sailesh Thapa
(74) *Attorney, Agent, or Firm* — Hodgson Russ LLP (57) ABSTRACT

A detection circuit and a detection method for starting charging are provided. The detection circuit comprises a cell connector, a first controller, a second controller and a switch circuit. The first controller sends an anode contact signal, a cathode contact signal and an electric quantity signal received from the cell connector to the second controller; the second controller sends a start instruction to the first controller if a charging request signal is received, the anode of the cell is well contacted, the cathode of the cell is well contacted, and a voltage of the cell does not exceed a voltage threshold; the first controller sends a connection instruction to the switch circuit to control connection of a charging terminal and a cell terminal of the switch circuit, such that a charging adapter charges the cell through the switch circuit.

20 Claims, 4 Drawing Sheets (58) Field of Classification Search
CPC ........ H02J 7/1461; H02J 7/166; G01R 31/06; G01R 29/0892; G01R 19/14; C25D 5/18; H02H 11/002; H01H 51/005
USPC .......................................................... 320/165
See application file for complete search history.

(56) References Cited

U.S. PATENT DOCUMENTS

2014/0266057 A1* 9/2014 Woods .............. H01M 10/4221
320/128
2015/0326046 A1* 11/2015 Song ..................... H02J 7/0052
320/107

FOREIGN PATENT DOCUMENTS

| CN | 103001267 | 3/2013 |
| CN | 202888813 | 4/2013 |
| CN | 104810874 | 7/2015 |
| EP | 0803097 | 10/1997 |
| WO | 2004088816 | 10/2004 |

OTHER PUBLICATIONS

International Searching Authority, Written Opinion of the International Searching Authority for PCT/CN2014/077014 Sep. 26, 2014.

* cited by examiner

Fig. 4

DETECTION CIRCUIT AND METHOD FOR STARTING CHARGING

CROSS-REFERENCE TO RELATED APPLICATIONS

This application is a U.S. national phase application based up an International Application No. PCT/CN2014/077014, filed on May 8, 2014, which is based on and claims priority to Chinese Patent Application No. 201410042603.8, filed on Jan. 28, 2014, the entire contents of which are incorporated herein by reference.

TECHNICAL FIELD

The present disclosure generally relates the mobile terminal field, and more particularly, to a detection circuit and a detection method for starting charging.

BACKGROUND

With the time goes on, the internet and mobile communication network provide massive function applications. A user cannot only use a mobile terminal to perform conventional applications, such as answering the phone or making a call, but can also use the mobile terminal to browse webpages, transmit pictures or play games, etc.

When the mobile terminal is used to handle matters, a huge quantity of electricity in a cell of the mobile terminal is consumed due to the increased usage frequency of the mobile terminal, such that it is required to charge the mobile terminal frequently. With the accelerated pace of life, particularly, more and more emergencies, the user wants to charge the cell of the mobile terminal with large current.

With the increasing usage frequency of the mobile terminal, it is required to charge the mobile terminal frequently. Before charging the cell of the mobile terminal, it is required to detect some factors causing abnormal charging, including whether a charging contact node is well contacted an anode of the cell, whether a charging contact node is well contacted a cathode of the cell, whether an electric quantity of the cell is enough, etc. Once the above factors occur, it is easy to cause safety accidents, for example, damage internal circuits (including a charging circuit) in the mobile terminal, a charging interface and a charging adapter, or even cause fire.

SUMMARY

Embodiments of the present disclosure relate to a detection circuit and a detection method for starting charging.

In at least one embodiment of the present disclosure relates to a detection circuit for starting charging having a cell anode terminal, a high-level charging input terminal and a low-level charging input terminal. The detection circuit for starting charging includes:

a cell connector, in which a first anode contact feedback terminal, a second anode contact feedback terminal, an electric-quantity feedback data terminal, an electric-quantity feedback clock terminal and a cathode contact feedback terminal of the cell connector are coupled to a first anode contact receiving terminal, a second anode contact receiving terminal, an electric-quantity receiving terminal, a clock terminal, and a cathode contact receiving terminal of a first controller respectively, the first anode contact feedback terminal is coupled to the cell anode terminal, and the cell connector is configured to generate an anode contact signal when it is detected whether an anode of the cell is contacted, to generate a cathode contact signal when it is detected whether a cathode of the cell is contacted, to generate an electric quantity signal when an electric quantity of the cell is detected, and to send the anode contact signal, the cathode contact signal and the electric quantity signal to the first controller;

the first controller, in which a first enable terminal and a first data terminal of the first controller are coupled to a second enable terminal and a second data terminal of a second controller respectively, a first control terminal of the first controller is coupled to a first controlled terminal of a switch circuit, the first controller has a third data terminal and a fourth data terminal, and is configured to send the anode contact signal, the cathode contact signal and the electric quantity signal received to the second controller, to send a charging request signal to the second controller if the charging request signal sent by a charging adapter is received, to receive a start instruction sent by the second controller, and to send a connection instruction to the switch circuit if the start instruction is received;

the second controller, configured to receive the charging request signal sent by the first controller, to receive the anode contact signal, the cathode contact signal and the electric quantity signal sent by the first controller, and to send the start instruction to the first controller if the charging request signal is received, it is determined that the anode of the cell is well contacted according to the anode contact signal, it is determined that the cathode of the cell is well contacted according to the cathode contact signal, and it is determined that a voltage of the cell does not exceed a voltage threshold according to the electric quantity signal;

the switch circuit, in which a cell terminal and a charging terminal of the switch circuit are coupled to the cell anode terminal and the high-level charging input terminal respectively, a second controlled terminal of the switch circuit is coupled to a second control terminal of the first controller, and the switch circuit is configured to connect the charging terminal with the cell terminal if the connection instruction sent by the first controller is received, such that the charging adapter charges the cell.

In at least one embodiment of the present disclosure relates to a detection method for starting charging. The method is applied in a detection circuit for starting charging including a cell connector, a first controller, a second controller and a switch circuit. The detection method for starting charging includes:

with the cell connector, detecting in real time whether an anode of a cell is in contact and generating an anode contact signal, detecting in real time whether a cathode of the cell is in contact and generating a cathode contact signal, detecting an electric quantity of the cell in real time and generating an electric quantity signal, and sending the anode contact signal, the cathode contact signal and the electric quantity signal to the first controller;

with the first controller, sending the anode contact signal, the cathode contact signal and the electric quantity signal to the second controller;

with the first controller, sending a charging request signal to the second controller if the charging request signal sent by the charging adapter is received;

with the second controller, sending a start instruction to the first controller, if the charging request signal is received, it is determined that the anode of the cell is well contacted according to the anode contact signal, it is determined that the cathode of the cell is well contacted according to the cathode contact signal, and it is determined that a voltage of the cell does not exceed a voltage threshold according to the electric quantity signal;

with the first controller, sending a connection instruction to the switch circuit if the start instruction is received;

with the switch circuit, connecting a cell terminal with a charging terminal if the connection instruction sent by the first controller is received, such that the charging adapter charges the cell.

BRIEF DESCRIPTION OF THE DRAWINGS

In order to make the technical solutions of embodiments of the present disclosure more clearly, the accompanying drawings used in the description of embodiments of the present disclosure are briefly described hereunder. Obviously, the described drawings are merely some embodiments of present disclosure. For persons skilled in the art, other drawings may be obtained based on these drawings without any creative work.

DETAILED DESCRIPTION

To make the objectives, the technical solutions, and the advantages of embodiments of the present disclosure clearer, the present disclosure is hereinafter further described with reference to the accompanying drawings in embodiments of the present disclosure. It should be understood that, the described embodiments are merely used to explain the present disclosure, but shall not be construed to limit the present disclosure.

A charging adapter in embodiments of the present disclosure can include a terminal capable of outputting a power signal to charge a cell (a cell of a mobile terminal), such as a power adapter, a charger, an IPAD, a smart phone, etc.

In order to explain technical solutions in the present disclosure, specific embodiments are hereinafter described for explanation. In at least one embodiment, "first" used in "first USB interface", "first power line" and "first ground line" is used herein for reference, "second" used in "second USB interface", "second power line" and "second ground line" is also used herein for reference.

In an embodiment of the present disclosure, when a charging adapter charges a mobile terminal, the charging adapter will directly charge a cell of the mobile terminal via a second power line in a second USB interface of the charging adapter and via a first power line in a first USB interface of the mobile terminal in sequence, and will not send a charging request signal to a first controller 1 in the mobile terminal, if the charging adapter is a conventional charging adapter.

However, the charging adapter provided by embodiments of the present disclosure has a third controller, which sends the charging request signal to the first controller 1 when the second USB interface of the charging adapter is insertion-connected with the first USB interface of the mobile terminal, and asks the first controller whether there is a need to perform current charging on the cell of the mobile terminal via the charging request signal.

Figure 1:
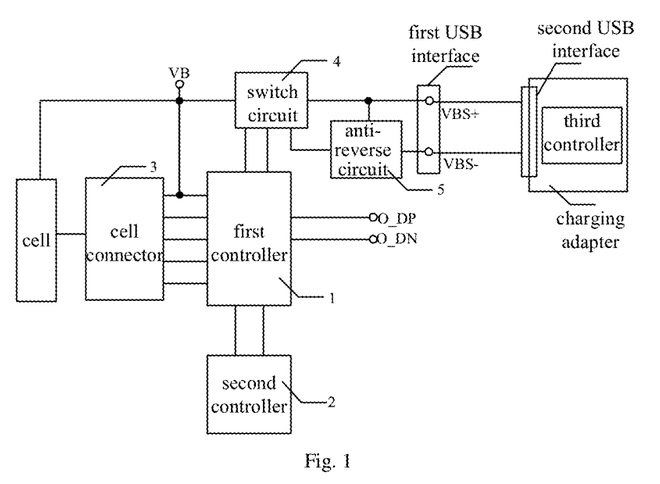
FIG. 1 is a schematic diagram showing a circuit structure of a detection circuit for starting charging according to an embodiment of the present disclosure.

FIG. 1 shows a schematic diagram of a detection circuit for starting charging provided by embodiments of the present disclosure. For illustration purposes, only parts related to embodiments of the present disclosure are shown, which are described in detail hereinafter.

The detection circuit for starting charging provided by embodiments of the present disclosure has a cell anode terminal, a high-level charging input terminal and a low-level charging input terminal. The detection circuit for starting charging includes a cell connector 3, a first controller 1, a second controller 2 and a switch circuit 4.

A first anode contact feedback terminal, a second anode contact feedback terminal, an electric-quantity feedback data terminal, an electric-quantity feedback clock terminal and a cathode contact feedback terminal of the cell connector 3 are coupled to a first anode contact receiving terminal, a second anode contact receiving terminal, an electric-quantity receiving terminal, a clock terminal, and a cathode contact receiving terminal of the first controller 1 respectively. The first anode contact feedback terminal is coupled to the cell anode terminal. The cell connector 3 is configured to generate an anode contact signal when it is detected whether an anode of the cell is contacted, to generate a cathode contact signal when it is detected whether a cathode of the cell is contacted, to generate an electric quantity signal when an electric quantity of the cell is detected, and to send the anode contact signal, the cathode contact signal and the electric quantity signal to the first controller 1.

A first enable terminal and a first data terminal of the first controller 1 are coupled to a second enable terminal and a second data terminal of a second controller 2 respectively. A first control terminal of the first controller 1 is coupled to a first controlled terminal of the switch circuit 4. The first controller 1 has a third data terminal and a fourth data terminal, and is configured to send the anode contact signal, the cathode contact signal and the electric quantity signal received to the second controller 2, to send a charging request signal to the second controller 2 if the charging request signal sent by the charging adapter is received, to receive a start instruction sent by the second controller 2, and to send a connection instruction to the switch circuit 4 if the start instruction is received.

The second controller 2 is configured to receive the charging request signal sent by the first controller 1, to receive the anode contact signal, the cathode contact signal and the electric quantity signal sent by the first controller 1, and to send the start instruction to the first controller 1 if the charging request signal is received, it is determined that the anode of the cell is well contacted according to the anode contact signal, it is determined that the cathode of the cell is well contacted according to the cathode contact signal, and it is determined that a voltage of the cell does not exceed a voltage threshold according to the electric quantity signal.

A cell terminal and a charging terminal of the switch circuit 4 are coupled to the cell anode terminal and the high-level charging input terminal respectively, and a second controlled terminal of the switch circuit 4 is coupled to a second control terminal of the first controller 1. The switch circuit 4 is configured to connect the charging terminal with the cell terminal if the connection instruction sent by the first controller 1 is received, such that the charging adapter charges the cell.

In at least one embodiment, the cell anode terminal of the detection circuit for starting charging is coupled to a node VB, the high-level charging input terminal of the detection circuit for starting charging is coupled to a node VBS+, and the low-level charging input terminal of the detection circuit for starting charging is coupled to a node VBS−.

In at least one embodiment, the second controller 2 is a controller used for executing applications, and the second controller 2 is used for answering a call, playing an online audio or video, online Wechat, or the like.

In addition, In at least one embodiment, the first controller is newly added to the mobile terminal in the related art, and is configured to communicate with the third controller of the charging adapter and the second controller 2, for controlling the charging adapter to charge the cell of the mobile terminal.

Thus, when the first USB interface of the mobile terminal is insertion-connected with the second USB interface of the charging adapter, the third controller in the charging adapter sends the charging request signal to the first controller 1, and the first controller 1 sends the charging request signal received to the second controller 2.

In addition, the cell connector 3 generates detection signals such as the anode contact signal, the cathode contact signal and the electric quantity signal in real time. Meanwhile, the first controller 1 receives the detection signals such as the anode contact signal, the cathode contact signal and the electric quantity signal in real time, and sends the above received detection signals to the second controller 2.

Further, after receiving the charging request signal, the second controller 2 determines whether a positive charging contact node of the charging circuit of the mobile terminal is well contacted the anode of the cell according to the received anode contact signal, determines whether a negative charging contact node of the charging circuit of the mobile terminal is well contacted the cathode of the mobile terminal according to the received cathode contact signal, and determines whether a voltage of the cell exceeds a voltage threshold (the voltage threshold is set according to actual charging requirements, and is generally set to be close to a voltage of the cell fully charged, for example, 4.35V) according to the electric quantity signal.

Further, if it is detected that the positive charging contact node is well contacted the anode of the cell, the negative charging contact node is well contacted the cathode of the cell, and the voltage of the cell is lower than the voltage threshold, the second controller 2 sends the start instruction to the first controller 1, in which the start instruction indicates that the charging adapter can charges the cell.

Further, when the first controller 1 receives the start instruction, it sends the connection instruction to the switch circuit 4. When the switch circuit 4 receives the connection instruction, it connects the cell terminal with the charging terminal, such that the charging adapter may charge the cell of the mobile terminal via the second USB interface, via the first USB interface and via the switch circuit 4 in sequence.

In at least one embodiment, the third controller of the charging adapter sends the charging request signal to the first controller 1, such that the second controller 2 of the mobile terminal determines whether to receive the large-current charging from the charging adapter, in which the charging current may reach 3 A or greater.

In another embodiment of the present disclosure, the switch circuit 4 is further configured to disconnect the charging terminal from the cell terminal when receiving a first switch-off instruction sent by the first controller 1, so as to control the charging adapter to stop charging the cell.

In at least one embodiment, the second controller 2 sends a not-start instruction to the first controller 1 after receiving the charging request signal, if the second controller 2 determines that the positive charging contact node is not well contacted the anode of the cell according to the received anode contact signal, or if the second controller 2 determines that the negative charging contact node is not well contacted the cathode of the cell, or if the second controller 2 determines that the voltage of the cell has exceeded the voltage threshold according to the electric quantity signal. When the first controller 1 receives the not-start instruction, it sends the first switch-off instruction to the switch circuit 4, and then the connection between the cell terminal and the charging terminal of the switch circuit 4 is switched off. In at least one embodiment, since the charging terminal of the switch circuit 4 is typically disconnected from the cell terminal of the switch circuit 4 in the non-charging state, the second controller 2 does not need to send the not-start instruction to the first controller 1 after receiving the charging request signal, the first controller 1 does not need to send the first switch-off instruction to the switch circuit 4, and the switch circuit 4 keeps the disconnection state between the cell terminal and the charging terminal, if the anode of the cell is not well contacted, or the cathode of the cell is not well contacted, or the voltage of the cell exceeds the voltage threshold.

In another embodiment of the present disclosure, the detection circuit for starting charging further includes an anti-reverse circuit 5.

A high level terminal, a low level terminal and a control output terminal of the anti-reverse circuit 5 are coupled to the high-level charging input terminal, the low-level charging input terminal and a third controlled terminal of the switch circuit 4 respectively. The anti-reverse circuit 5 is configured to send a second switch-off instruction to the switch circuit 4 if a ground signal is coupled to the high-level charging input terminal and a power signal is coupled to the low-level charging input terminal, such that the switch circuit 4 disconnects the cell terminal from the charging terminal.

In addition, in order to avoid that the ground signal is coupled to the anode of the cell and the power signal is coupled to the cathode of the cell during charging the cell, whether the power signal and the ground signal are coupled inversely is detected at the high-level charging input terminal and the low-level charging input terminal of the detection circuit for starting charging, such that it may ensure that the electric signal coupled to the first power line of the first USB interface is the power signal and the electric signal coupled to the first ground line of the first USB interface is the ground signal.

If the electric signal coupled to the first power line of the first USB interface is the ground signal and the electric signal coupled to the first ground line of the first USB interface is the power signal, the anti-reverse circuit 5 sends the second switch-off instruction to the switch circuit 4, and then the switch circuit 4 disconnects the cell terminal from the charging terminal in time, such that the charging adapter is stopped from charging the cell of the mobile terminal. In this way, anti-reverse protection may be performed on the cell and internal circuits (including the charging circuit) of the mobile terminal.

Figure 2:
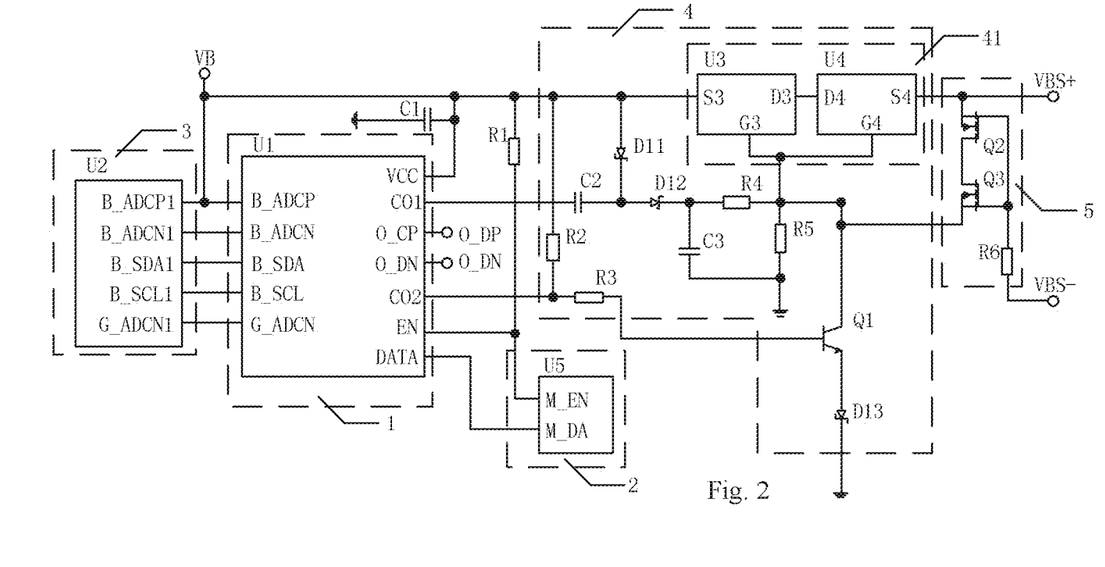
FIG. 2 is a schematic diagram showing a specific circuit structure of a detection circuit for starting charging according to an embodiment of the present disclosure.

FIG. 2 shows a specific circuit diagram of a detection circuit for starting charging according to an embodiment of the present disclosure. For illustration purposes, only parts related to embodiments of the present disclosure are shown, which will be described in detail hereinafter.

In at least one embodiment, the cell connector 3 is a cell connection chip U2. A first anode contact feedback pin B_ADCP1, a second anode contact feedback pin B_ADCN1, an electric-quantity feedback data pin B_SDA1, an electric-quantity feedback clock pin B_SCL1 and a cathode contact feedback pin G_ADCN1 of the cell connection chip U2 correspond to the first anode contact feedback terminal, the second anode contact feedback terminal, the electric-quantity feedback data terminal, the electric-quantity feedback clock terminal and the cathode contact feedback terminal of the cell connector 3 respectively.

In at least one embodiment, the cell connection chip U2 collects the voltage value at the node VB (the charging contact node of the anode of the cell) from the first anode contact feedback pin B_ADCP1 thereof, and collects the voltage value at the anode contact node on the cell of the mobile terminal from the second anode contact feedback pin B_ADCN1 thereof, and thus may determine whether the voltage value collected from the first anode contact feedback pin B_ADCP1 is similar to or same as approximately equal to the voltage value collected from the second anode contact feedback pin B_ADCN1, if yes, may conclude that the anode contact node is well contacted the anode of the cell, and if no, may conclude that the anode contact node is not well contacted the anode of the cell. Meanwhile, the cell connection chip U2 also obtains the current electric quantity of the cell (i.e., the voltage value of the cell) via the electric-quantity feedback data pin B_SDA1 in real time, under the control of the clock signal at the electric-quantity feedback clock pin B_SCL1. Also, the cell connection chip U2 obtains the cathode contact signal from the cathode contact feedback pin G_ADCN1, in which the cathode contact signal is used for determining whether the negative charging contact node is well contacted the cathode of the cell.

In at least one embodiment, the first controller 1 is the first control chip U1. A first anode contact receiving pin B_ADCP, a second anode contact receiving pin B_ADCN, an electric-quantity receiving pin B_SDA, a clock pin B_SCL, a cathode contact receiving pin G_ADCN, a first enable pin EN, a first data pin DATA, a first control pin CO1, a second control pin CO2, a third data pin O_DP and a fourth data pin O_DN of the first control chip U1 correspond to the first anode contact receiving terminal, the second anode contact receiving terminal, the electric-quantity receiving terminal, the clock terminal, the cathode contact receiving terminal, the first enable terminal, the first data terminal, the first control terminal, the second control terminal, the third data terminal and the fourth data terminal of the first controller 1 respectively.

During operation, the first control chip U1 obtains the anode contact signal from the first anode contact receiving pin B_ADCP and the second anode contact receiving pin B_ADCN thereof, obtains the electric quantity signal from the electric-quantity receiving pin B_SDA according to the clock signal at the clock pin B_SCL, and in addition, obtains the cathode contact signal from the cathode contact receiving pin G_ADCN.

In addition, the first control chip U1 may notify the second control chip U5 via the first enable pin EN that, it needs to send data (the charging request signal, the anode contact signal, the cathode contact signal and the electric quantity signal) to the second data terminal of the second controller 2. Further, the first control chip U1 sends the charging request signal, the anode contact signal, the cathode contact signal and the electric quantity signal to the second data terminal of the second controller 2 from the first data pin DATA.

In at least one embodiment, the second controller 2 is the second control chip U5. A second enable pin M_EN and a second data pin M_DA of the second control chip U5 correspond to the second enable terminal and the second data terminal of the second controller 2 respectively.

Accordingly, the second control chip U5 may also know via the second enable pin M_EN that the first control chip U1 needs to communicate therewith, and further receives the charging request signal, the anode contact signal, the cathode contact signal and the electric quantity signal from the second data pin M_DA.

In addition, the second control chip U5 may also notify the first control chip U1 via the second enable pin M_EN that, it needs to communicate therewith, and further sends the start instruction to the first data terminal of the first controller 1 from the second data pin M_DA.

In at least one embodiment, the switch circuit 4 includes a second capacitor C2, a third capacitor C3, a second resistor R2, a third resistor R3, a fourth resistor R4, a fifth resistor R5, a first Schottky diode D11, a second Schottky diode D12, a third Schottky diode D13, a NPN transistor Q1 and a switch module 41.

A first terminal of the second resistor R2, a first terminal of the switch module 41, a first terminal of the second capacitor C2 and a second terminal of the second resistor R2 correspond to the cell terminal, the charging terminal, the first controlled terminal and the second controlled terminal of the switch circuit 4. A first terminal and a second terminal of the third resistor R3 are coupled to the second terminal of the second resistor R2 and a base of the NPN transistor Q1 respectively. An anode and a cathode of the third Schottky diode D13 are coupled to an emitter of the NPN transistor Q1 and ground respectively. An anode and a cathode of the first Schottky diode D11 are coupled to the first terminal of the second resistor R2 and a second terminal of the second capacitor C2 respectively. An anode terminal and a cathode terminal of the second Schottky diode D12 are coupled to the second terminal of the second capacitor C2 and a first terminal of the fourth resistor R4 respectively. A first terminal and a second terminal of the third capacitor C3 are coupled to the cathode of the first Schottky diode D11 and ground respectively. A first terminal and a second terminal of the fifth resistor R5 is coupled to the first terminal of the fourth resistor R4 and ground respectively. A collector of the NPN transistor Q1 is coupled to a second terminal of the fourth resistor R4. A second terminal and a controlled terminal of the switch module 41 are coupled to the first terminal of the second resistor R2 and the second terminal of the fourth resistor R4 respectively.

During operation, when the connection instruction (the high-level connection instruction) is received from the first controlled terminal, the controlled terminal of the switch module 41 also receives the high-level electric signal. Further, the second terminal of the switch module 41 is coupled to the first terminal of the switch module 41, and thus an electric patch from the high-level charging input terminal to the low-level charging input terminal via the switch module 41 is formed. Thus, the power signal coupled to the high-level charging input terminal may charge the cell of the terminal via the switch circuit 4.

When the first switch-off instruction with high level is received from the second controlled terminal, the NPN transistor Q1 is turned on, and then the controlled terminal of the switch module 41 receives a low-level electric signal, and the electric connection between the first terminal and the second terminal of the switch module 41 is switched off, and thus the electric path from the high-level charging input terminal to the low-level charging input terminal is switched off, and charging to the cell of the mobile terminal via the switch circuit 4 is stopped.

In at least one embodiment, the detection circuit for starting charging further includes a first resistor R1 and a first capacitor C1. A first terminal of the first resistor R1 is coupled to the cell terminal of the switch circuit 4, a second terminal of the first resistor R1 is coupled to the first enable terminal of the first controller 1 and the second enable terminal of the second controller 2 respectively, a first terminal of the first capacitor C1 is coupled to the cell terminal of the switch circuit 4 and a power terminal of the first controller 1 respectively, and a second terminal of the first capacitor C1 is coupled to ground.

In addition, with the first resistor R1, both the first enable pin EN of the first control chip U1 and the second enable pin M_EN of the second control chip U5 are set to high level. In addition, since the first terminal of the first resistor R1 is coupled to the node VB, it is further coupled to the anode of the cell. Thus, as long as the cell of the mobile terminal has enough electric quantity, the first control chip U1 always keeps communication with the second control chip U5. Meanwhile, the first control chip U1 sends the anode contact signal, the cathode contact signal and the electric quantity signal to the second control chip U5 in real time, and the second control chip U5 sends the switch-off instruction to the first control chip U1 if the negative charging contact node is not well contacted the cathode of the cell or if the positive charging contact node is not well contacted the anode of the cell, such that the first control chip U1 sends the first switch-off instruction to the switch circuit 4, and further controls the first terminal of the switch module 41 to disconnect from the second terminal of the switch module 41 in time, thereby stopping charging the cell of the mobile terminal via the switch circuit 4 in time.

In at least one embodiment, the switch module 41 includes a third switch chip U3 and a fourth switch chip U4. A source pin S3 of the third switch chip U3, a source pin S4 of the fourth switch chip U4 and a grid pin G3 of the fourth switch chip U4 correspond to the second terminal, the first terminal and the controlled terminal of the switch module 41, and a grid pin and a drain pin of the third switch chip U3 are coupled to the grid pin and a drain pin of the fourth switch chip U4 respectively.

In at least one embodiment, when the controlled terminal of the switch module 41 receives a high-level electric signal, both the grid pin G3 of the third switch chip U3 and the grid pin G4 of the fourth switch chip U4 also receive the high-level electric signal, and then the source pin S3 of the third switch chip U3 is electrically coupled to the drain pin D3, the source pin S4 of the fourth switch chip U4 is electrically coupled to the drain pin D4, and thus an electric path is formed by the source pin S3 of the third switch chip U3 and the source pin S4 of the fourth switch chip U4, and the first terminal and the second terminal of the switch module 41 are electrically coupled.

In contrary, when the controlled terminal of the switch module 41 receives a low-level electric signal, both the grid pin G3 of the third switch chip U3 and the grid pin G4 of the fourth switch chip U4 also receive the low-level electric signal, and then the source pin S3 of the third switch chip U3 cannot be electrically coupled to the drain pin D3, the source pin S4 of the fourth switch chip U4 cannot be electrically coupled to the drain pin D4, and thus an electric path cannot be formed by the source pin S3 of the third switch chip U3 and the source pin S4 of the fourth switch chip U4, and the first terminal and the second terminal of the switch module 41 are not electrically coupled. Thus, the power signal coupled to the high-level charging input terminal cannot charge the cell of the terminal via the switch circuit 4.

In at least one embodiment, the anti-reverse circuit 5 includes a sixth resistor R6, a first NMOS transistor Q2 and a second NMOS transistor Q3.

A source of the first NMOS transistor Q2, a second terminal of the sixth resistor R6 and a source of the NMOS transistor Q3 correspond to the high level terminal, the low level terminal and the control output terminal of the anti-reverse circuit 5 respectively, a grid and a drain of the first NMOS transistor Q2 are coupled to a grid and a drain of the second NMOS transistor Q3 respectively, and a first terminal of the sixth resistor R6 is coupled to the grid of the first NMOS transistor Q2.

In at least one embodiment, when the ground signal is coupled to the high level terminal of the anti-inverse connection circuit 5 and the power signal is coupled to the low level terminal, both the first NMOS transistor Q2 and the second NMOS transistor Q3 are turned on. Further, the controlled terminal of the switch module 41 is coupled to the low-level electric signal, the first terminal and the second terminal of the switch module 41 cannot form an electric path, and the charging circuit via which the power signal coupled to the high-level charging input terminal charges the cell of the mobile terminal is switched off.

In at least one embodiment, the detection circuit for starting charging is included in the mobile terminal.

The mobile terminal includes the first USB interface, and the charging adapter includes the second USB interface. The first power lines and the first ground lines included in the first USB interface are coupled to the second power lines and the second ground lines included in the second USB interface respectively. The number of the first power lines is P, where p is greater than or equal to 2. The number of the first ground lines is Q, where Q is greater than or equal to 2.

Each of the P first power lines is coupled to the high-level charging input terminal of the detection circuit for starting charging, and each of the Q first ground lines is coupled to the low-level charging input terminal of the detection circuit for starting charging.

In at least one embodiment, the mobile terminal includes the detection circuit for starting charging and the first USB interface, in which the first USB interface includes P first power lines and Q first ground lines; each of the P first power lines is coupled to the high-level charging input terminal of the detection circuit for starting charging, and each of the Q first ground lines is coupled to the low-level charging input terminal of the detection circuit for starting charging. When the first USB interface of the mobile terminal is insertion-connected with the second USB interface of the charging adapter, the first power lines included in the first USB interface are coupled to the second power lines included in the second USB interface respectively, and the first ground lines included in the first USB interface are coupled to the second ground lines included in the second USB interface respectively.

Further, the insertion-connected first USB interface and second USB interface can withstand the large-current charging (the charging current equal to or greater than 3 A).

In addition, in at least one embodiment the mobile terminal includes the conventional charging circuit. Once the first USB interface is coupled to the second USB interface, the power signal output by the charging adapter charges the cell of the terminal directly via the conventional charging circuit after flowing through the first USB interface (for example, the charging voltage is 5V and the charging current is lower than 3 A).

Meanwhile, the third controller of the charging adapter sends the charging request signal to the first controller 1. The first controller 1 may know via the charging request signal that, the charging adapter has the capability of large-current charging (the charging current equal to or greater than 3 A). Thus, if there is a need to perform the large-current charging, the switch circuit 4 is controlled such that the cell anode terminal is electrically coupled to the high-level charging input terminal, and thus the cell may be charged via the switch circuit 4 as well as via the conventional charging circuit, thereby realizing the large-current charging.

In another embodiment of the present disclosure, if the charging adapter insertion-connected with the first USB interface is the conventional charging adapter (for example, the charging adapter using the MICRO USB interface for charging), conventional charging may still be performed (the only one power line and the only one ground line in the MICRO USB interface are insertion-connected with one first power line and one first ground line of the first charging interface respectively), i.e., the cell is charged by using the power line and the ground line.

In another embodiment of the present disclosure, the second USB interface has M second power lines, where M is equal to or greater than 2; the second USB interface has N second ground lines, where N is equal to or greater than 2.

In embodiments of the present disclosure, similar to the first USB interface, the second USB interface also has at least two second power lines and at least two second ground lines. Further, when the first USB interface is insertion-connected with the second USB interface, at least two charging circuits may be formed, thus ensuring that the insertion-connected first USB interface and second USB interface can support the large-current charging (the charging current equal to or greater than 3 A).

In at least one embodiment, p is equal to M, and Q is equal to N. Each of the first power lines included in the first USB interface is made of chrome bronze C18400 or phosphor bronze C7025, each of the first ground lines included in the first USB interface is made of chrome bronze C18400 or phosphor bronze C7025, each of the second power lines included in the second USB interface is made of chrome bronze C18400 or phosphor bronze C7025, and each of the second ground lines included in the second USB interface is made of chrome bronze C18400 or phosphor bronze C7025.

In this embodiment, when the first USB interface is insertion-connected with the second USB interface, at least two charging circuits may be formed (the number of the charging circuits is a minimum of P and Q), and thus the insertion-connected first USB interface and second USB interface may support the large-current charging (the charging current equal to or greater than 3 A).

In order to realize the matched insertion-connection and the standardized production of the first USB interface and the second USB interface, the number of the first power lines included in the first USB interface is equal to the number of the second power lines included in the second USB interface, and the number of the first ground lines included in the first USB interface is equal to the number of the second ground lines in the second USB interface.

In addition, in at least one embodiment, the power line and the ground line in the conventional MICRO USB interface used for charging the cell of the mobile terminal are made of metal foil with conductivity less than 20%. However, the first power lines and the first ground lines included in the first USB interface provided by embodiments of the present disclosure are made of phosphor bronze C7025 with conductivity reaching 50%, and the second power lines and the second ground lines included in the second USB interface provided by embodiments of the present disclosure are made of phosphor bronze C7025 with conductivity reaching 50%. Thus, compared to the conventional MICRO USB interface, the first USB interface and the second USB interface provided by embodiments of the present disclosure may support greater charging current. In at least one embodiment, each of the first power lines and the first ground lines included in the first USB interface provided by embodiments of the present disclosure and the second power lines and the second ground lines included in the second USB interface provided by embodiments of the present disclosure is made of chrome bronze C18400 with conductivity reaching 70%, thereby further enhancing the charging current.

Figure 3:
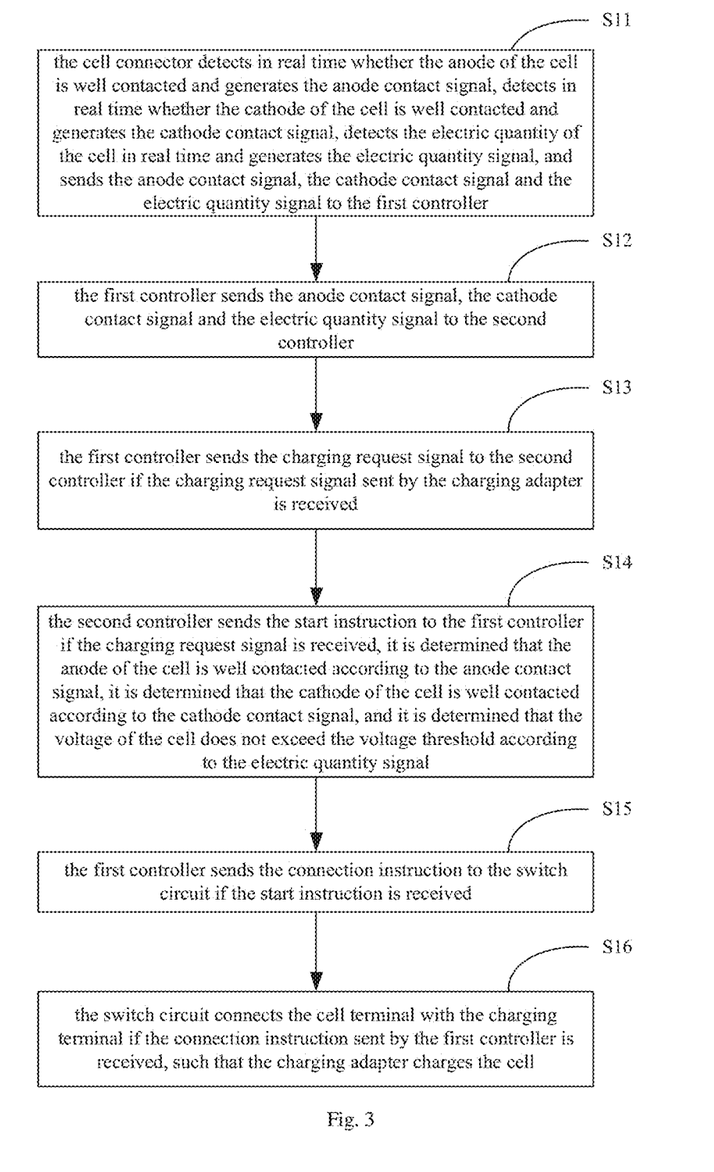
FIG. 3 is a first flow chart showing a detection method for starting charging according to an embodiment of the present disclosure.

FIG. 3 shows a flow chart of a detection method for starting charging according to an embodiment of the present disclosure. For facilitating explanation, only parts related to embodiments of the present disclosure are shown, which will be described in detail hereinafter.

The detection method for starting charging is applied in a detection circuit for starting charging including a cell connector, a first controller, a second controller and a switch circuit. The detection method for starting charging includes following steps.

In step S11, the cell connector detects in real time whether the anode of the cell is in contact and generates the anode contact signal, detects in real time whether the cathode of the cell is in contact and generates the cathode contact signal, detects the electric quantity of the cell in real time and generates the electric quantity signal, and sends the anode contact signal, the cathode contact signal and the electric quantity signal to the first controller.

In step S12, the first controller sends the anode contact signal, the cathode contact signal and the electric quantity signal to the second controller.

In step S13, the first controller sends the charging request signal to the second controller if the charging request signal sent by the charging adapter is received.

In step S14, the second controller sends the start instruction to the first controller if the charging request signal is received, it is determined the anode of the cell is well contacted according to the anode contact signal, it is determined that the cathode of the cell is well contacted according to the cathode contact signal, and it is determined that a voltage of the cell does not exceed a voltage threshold according to the electric quantity signal.

In step S15, the first controller sends the connection instruction to the switch circuit if the start instruction is received.

In step S16, the switch circuit connects the cell terminal with the charging terminal if the connection instruction sent by the first controller is received, such that the charging adapter charges the cell.

In this embodiment, the first controller receives the anode contact signal, the cathode contact signal and the electric quantity signal sent by the cell connector in real time. Further, the first controller sends the anode contact signal, the cathode contact signal and the electric quantity signal to the second controller.

Once the first controller receives the charging request signal sent by the third controller in the charging adapter, the first controller forwards the charging request signal to the second controller.

After receiving the charging request signal, the second controller determines whether the positive charging contact node of the charging circuit of the mobile terminal is well contacted the anode of the cell according to the received anode contact signal, determines whether the negative charging contact node of the charging circuit of the mobile terminal is well contacted the cathode of the cell according to the received cathode contact signal, and determines whether the voltage of the cell exceeds the voltage threshold according to the electric quantity signal. If it is detected that the positive charging contact node is well contacted the anode of the cell, the negative charging contact node is well contacted the cathode of the cell, and the voltage of the cell is lower than the voltage threshold, the second controller sends the start instruction to the first controller. Further, the first controller sends the connection instruction to the switch circuit when the start instruction is received, and the switch circuit connects the cell terminal with the charging terminal when the connection instruction sent by the first controller is received. Thus, the charging adapter may charge the cell of the mobile terminal via the second USB interface, via the first USB interface and via the switch circuit in sequence.

Figure 4:
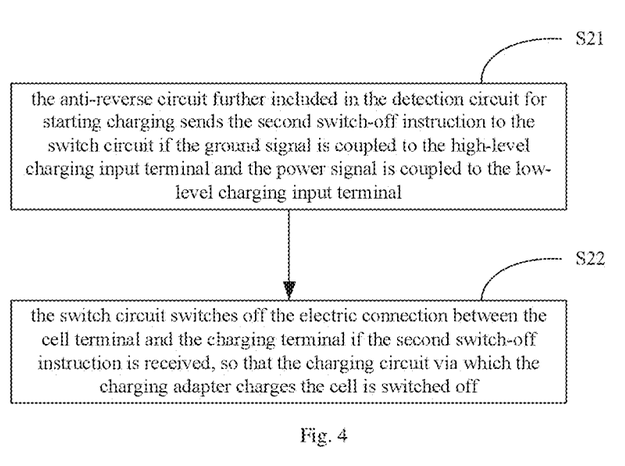
FIG. 4 is a second flow chart showing a detection method for starting charging according to an embodiment of the present disclosure.

In another embodiment of the present disclosure, shown in FIG. 4, the detection method for starting charging further includes following steps.

In step S21, the anti-reverse circuit further included in the detection circuit for starting charging sends the second switch-off instruction to the switch circuit if the ground signal is coupled to the high-level charging input terminal and the power signal is coupled to the low-level charging input terminal.

In step S22, the switch circuit switches off the electric connection between the cell terminal and the charging terminal if the second switch-off instruction is received, so that the charging circuit via which the charging adapter charges the cell is switched off.

Since the high-level charging input terminal is electrically coupled to the first power line in the first USB interface, the low-level charging input terminal is electrically coupled to the first ground line in the first USB interface.

Further, if the ground signal is coupled to the first power line of the first USB interface and the power signal is coupled to the first ground line of the first USB interface, the anti-reverse circuit outputs the second switch-off instruction to the switch circuit, the switch circuit switches off the electric connection between the cell terminal and the charging terminal in time, and the charging adapter is stopped from charging the cell of the mobile terminal. In this way, the anti-reverse protection may be performed on the cell and internal circuits (including the charging circuit) in the mobile terminal.

In this way, only if the electric signal coupled to the first power line of the first USB interface is the ground signal and the electric signal coupled to the first ground line of the first USB interface is the power signal, the cell of the mobile terminal may be charged via the first USB interface.

The embodiments described hereinabove are only preferred embodiments of the present application, and should not be interpreted as limitation to the present application. For the persons skilled in the art, various variations and modifications may be made to the present application. Any modifications, equivalent replacements and improvements made within the spirit and principle of the present application are also deemed to fall into the protection scope of the present application.

What is claimed is:

1. A detection circuit for starting charging, having a cell anode terminal, a high-level charging input terminal and a low-level charging input terminal, and comprising:

a cell connector, wherein a first anode contact feedback terminal, a second anode contact feedback terminal, an electric-quantity feedback data terminal, an electric-quantity feedback clock terminal and a cathode contact feedback terminal of the cell connector are coupled to a first anode contact receiving terminal, a second anode contact receiving terminal, an electric-quantity receiving terminal, a clock terminal, and a cathode contact receiving terminal of a first controller respectively, the first anode contact feedback terminal is coupled to the cell anode terminal, and the cell connector is configured to generate an anode contact signal when it is detected whether an anode of the cell is contacted, to generate a cathode contact signal when it is detected whether a cathode of the cell is contacted, to generate an electric quantity signal when an electric quantity of the cell is detected, and to send the anode contact signal, the cathode contact signal and the electric quantity signal to the first controller;

the first controller, wherein a first enable terminal and a first data terminal of the first controller are coupled to a second enable terminal and a second data terminal of a second controller respectively, a first control terminal of the first controller is coupled to a first controlled terminal of a switch circuit, the first controller has a third data terminal and a fourth data terminal, and is configured to send the anode contact signal, the cathode contact signal and the electric quantity signal received to the second controller, to send a charging request signal to the second controller if the charging request signal sent by a charging adapter is received, to receive a start instruction sent by the second controller, and to send a connection instruction to the switch circuit if the start instruction is received;

the second controller, configured to receive the charging request signal sent by the first controller, to receive the anode contact signal, the cathode contact signal and the electric quantity signal sent by the first controller, and to send the start instruction to the first controller if the charging request signal is received, it is determined that the anode of the cell is well contacted according to the anode contact signal, it is determined that the cathode of the cell is well contacted according to the cathode contact signal, and it is determined that a voltage of the cell does not exceed a voltage threshold according to the electric quantity signal;

the switch circuit, wherein a cell terminal and a charging terminal of the switch circuit are coupled to the cell anode terminal and the high-level charging input terminal respectively, a second controlled terminal of the switch circuit is coupled to a second control terminal of the first controller, and the switch circuit is configured to connect the charging terminal with the cell terminal if the connection instruction sent by the first controller is received, such that the charging adapter charges the cell.

2. The detection circuit for starting charging according to claim 1, further comprising:

an anti-reverse circuit, wherein a high level terminal, a low level terminal and a control output terminal of the anti-reverse circuit are coupled to the high-level charging input terminal, the low-level charging input terminal and a third controlled terminal of the switch circuit respectively, and the anti-reverse circuit is configured to send a second switch-off instruction to the switch circuit if a ground signal is coupled to the high-level charging input terminal and a power signal is coupled to the low-level charging input terminal, such that the switch circuit switches off electric connection between the cell terminal and the charging terminal.

3. The detection circuit for starting charging according to claim 2, wherein,
the anti-reverse circuit comprises a sixth resistor, a first NMOS transistor and a second NMOS transistor;
a source of the first NMOS transistor, a second terminal of the sixth resistor and a source of the NMOS transistor correspond to the high level terminal, the low level terminal and the control output terminal of the anti-reverse circuit respectively, a grid and a drain of the first NMOS transistor are coupled to a grid and a drain of the second NMOS transistor respectively, and a first terminal of the sixth resistor is coupled to the grid of the first NMOS transistor.

4. The detection circuit for starting charging according to claim 2, wherein
the cell connector is a cell connection chip, and a first anode contact feedback pin, a second anode contact feedback pin, an electric-quantity feedback data pin, an electric-quantity feedback clock pin and a cathode contact feedback pin of the cell connection chip correspond to the first anode contact feedback terminal, the second anode contact feedback terminal, the electric-quantity feedback data terminal, the electric-quantity feedback clock terminal and the cathode contact feedback terminal of the cell connector respectively;
the first controller is a first control chip, and a first anode contact receiving pin, a second anode contact receiving pin, an electric-quantity receiving pin, a clock pin, a cathode contact receiving pin, a first enable pin, a first data pin, a first control pin, a second control pin, a third data pin and a fourth data pin of the first control chip correspond to the first anode contact receiving terminal, the second anode contact receiving terminal, the electric-quantity receiving terminal, the clock terminal, the cathode contact receiving terminal, the first enable terminal, the first data terminal, the first control terminal, the second control terminal, the third data terminal and the fourth data terminal of the first controller respectively;
the second controller is a second control chip, and a second enable pin and a second data pin of the second control chip correspond to the second enable terminal and the second data terminal of the second controller respectively;
the switch circuit comprises a second capacitor, a third capacitor, a second resistor, a third resistor, a fourth resistor, a fifth resistor, a first Schottky diode, a second Schottky diode, a third Schottky diode, a NPN transistor and a switch module;
a first terminal of the second resistor, a first terminal of the switch module, a first terminal of the second capacitor and a second terminal of the second resistor correspond to the cell terminal, the charging terminal, the first controlled terminal and the second controlled terminal of the switch circuit, a first terminal and a second terminal of the third resistor are coupled to the second terminal of the second resistor and a base of the NPN transistor respectively, an anode and a cathode of the third Schottky diode are coupled to an emitter of the NPN transistor and ground respectively, an anode and a cathode of the first Schottky diode are coupled to the first terminal of the second resistor and a second terminal of the second capacitor respectively, an anode terminal and a cathode terminal of the second Schottky diode are coupled to the second terminal of the second capacitor and a first terminal of the fourth resistor respectively, a first terminal and a second terminal of the third capacitor are coupled to the cathode of the first Schottky diode and ground respectively, a first terminal and a second terminal of the fifth resistor is coupled to the first terminal of the fourth resistor and ground respectively, a collector of the NPN transistor is coupled to a second terminal of the fourth resistor, a second terminal and a controlled terminal of the switch module are coupled to the first terminal of the second resistor and the second terminal of the fourth resistor respectively;
the detection circuit for starting charging further comprises a first resistor and a first capacitor, a first terminal of the first resistor is coupled to the cell terminal of the switch circuit, a second terminal of the first resistor is coupled to the first enable terminal of the first controller and the second enable terminal of the second controller respectively, a first terminal of the first capacitor is coupled to the cell terminal of the switch circuit and a power terminal of the first controller respectively, and a second terminal of the first capacitor is coupled to ground.

5. The detection circuit for starting charging according to claim 1, wherein,
the cell connector is a cell connection chip, and a first anode contact feedback pin, a second anode contact feedback pin, an electric-quantity feedback data pin, an electric-quantity feedback clock pin and a cathode contact feedback pin of the cell connection chip correspond to the first anode contact feedback terminal, the second anode contact feedback terminal, the electric-quantity feedback data terminal, the electric-quantity feedback clock terminal and the cathode contact feedback terminal of the cell connector respectively;
the first controller is a first control chip, and a first anode contact receiving pin, a second anode contact receiving pin, an electric-quantity receiving pin, a clock pin, a cathode contact receiving pin, a first enable pin, a first data pin, a first control pin, a second control pin, a third data pin and a fourth data pin of the first control chip correspond to the first anode contact receiving terminal, the second anode contact receiving terminal, the electric-quantity receiving terminal, the clock terminal, the cathode contact receiving terminal, the first enable terminal, the first data terminal, the first control terminal, the second control terminal, the third data terminal and the fourth data terminal of the first controller respectively;
the second controller is a second control chip, and a second enable pin and a second data pin of the second control chip correspond to the second enable terminal and the second data terminal of the second controller respectively;
the switch circuit comprises a second capacitor, a third capacitor, a second resistor, a third resistor, a fourth resistor, a fifth resistor, a first Schottky diode, a second Schottky diode, a third Schottky diode, a NPN transistor and a switch module;

a first terminal of the second resistor, a first terminal of the switch module, a first terminal of the second capacitor and a second terminal of the second resistor correspond to the cell terminal, the charging terminal, the first controlled terminal and the second controlled terminal of the switch circuit, a first terminal and a second terminal of the third resistor are coupled to the second terminal of the second resistor and a base of the NPN transistor respectively, an anode and a cathode of the third Schottky diode are coupled to an emitter of the NPN transistor and ground respectively, an anode and a cathode of the first Schottky diode are coupled to the first terminal of the second resistor and a second terminal of the second capacitor respectively, an anode terminal and a cathode terminal of the second Schottky diode are coupled to the second terminal of the second capacitor and a first terminal of the fourth resistor respectively, a first terminal and a second terminal of the third capacitor are coupled to the cathode of the first Schottky diode and ground respectively, a first terminal and a second terminal of the fifth resistor is coupled to the first terminal of the fourth resistor and ground respectively, a collector of the NPN transistor is coupled to a second terminal of the fourth resistor, a second terminal and a controlled terminal of the switch module are coupled to the first terminal of the second resistor and the second terminal of the fourth resistor respectively;

the detection circuit for starting charging further comprises a first resistor and a first capacitor, a first terminal of the first resistor is coupled to the cell terminal of the switch circuit, a second terminal of the first resistor is coupled to the first enable terminal of the first controller and the second enable terminal of the second controller respectively, a first terminal of the first capacitor is coupled to the cell terminal of the switch circuit and a power terminal of the first controller respectively, and a second terminal of the first capacitor is coupled to ground.

6. The detection circuit for starting charging according to claim 5, wherein, the switch module comprises a third switch chip and a fourth switch chip;

a source pin of the third switch chip, a source pin of the fourth switch chip and a grid pin of the fourth switch chip correspond to the second terminal, the first terminal and the controlled terminal of the switch module, and a grid pin and a drain pin of the third switch chip are coupled to the grid pin and a drain pin of the fourth switch chip respectively.

7. The detection circuit for starting charging according to claim 5, wherein the cell connection chip is configured to collect a voltage value of a charging contact node of the anode of the cell from the first anode contact feedback pin, to collect a voltage value at an anode contact node on the cell from the second anode contact feedback pin, and to determine whether the voltage value collected from the first anode contact feedback pin is similar to or same as approximately equal to the voltage value collected from the second anode contact feedback pin, to conclude that the anode of the cell is well contacted if yes, and to conclude that the anode of the cell is not well contacted if no.

8. The detection circuit for starting charging according to claim 1, wherein, the detection circuit for starting charging is comprised in a mobile terminal;

the mobile terminal comprises a first USB interface, the charging adapter comprises a second USB interface; a first power line and a first ground line comprised in the first USB interface are insertion-connected with a second power line and a second ground line comprised in the second USB interface respectively; there are P first power lines, where P is greater than or equal to 2; there are Q first ground lines, where Q is greater than or equal to 2;

each of the P first power lines is coupled to the high-level charging input terminal of the detection circuit for starting charging, and each of the Q first ground lines is coupled to the low-level charging input terminal of the detection circuit for starting charging.

9. The detection circuit for starting charging according to claim 8, wherein, the second USB interface comprises M second power lines, where M is greater than or equal to 2;

the second USB interface comprises N second ground lines, where N is greater than or equal to 2.

10. The detection circuit for starting charging according to claim 9, wherein, P is equal to Q, and M is equal to N;

each of the first power lines comprised in the first USB interface is made of chrome bronze C18400 or phosphor bronze C7025, each of the first ground lines comprised in the first USB interface is made of chrome bronze C18400 or phosphor bronze C7025, each of the second power lines comprised in the second USB interface is made of chrome bronze C18400 or phosphor bronze C7025, and each of the second ground lines comprised in the second USB interface is made of chrome bronze C18400 or phosphor bronze C7025.

11. The detection circuit for starting charging according to claim 1, wherein the charging adapter comprises a third controller;

the third controller is configured to send the charging request signal to the first controller if a second USB interface of the charging adapter is insertion-connected to a first USB interface of a mobile terminal, and to ask the first controller whether there is a need to perform current charging on the cell via the charging request signal.

12. The detection circuit for starting charging according to claim 1, wherein the switch circuit is further configured to disconnect the charging terminal from the cell terminal when receiving a first switch-off instruction sent by the first controller, so as to control the charging adapter to stop charging the cell.

13. The detection circuit for starting charging according to claim 1, wherein, the second controller is further configured to send a not-start instruction to the first controller after receiving the charging request signal, if it is determined that the anode of the cell is not well contacted according to the anode contact signal, or it is determined that the cathode of the cell is not well contacted according to the cathode contact signal, or it is determined that the voltage of the cell exceeds the voltage threshold according to the electric quantity signal;

the first controller is further configured to receive the not-start instruction, and to send the first switch-off instruction to the switch circuit; and the switch circuit is further configured to disconnect the cell terminal from the charging terminal.

14. The detection circuit for starting charging according to claim 1, wherein,
the switch circuit is further configured to keep disconnection state between the cell terminal and the charging terminal, if the anode of the cell is not well contacted, or the cathode of the cell is not well contacted, or the voltage of the cell exceeds the voltage threshold.

15. A detection method for starting charging, applied in a detection circuit for starting charging comprising a cell connector, a first controller, a second controller and a switch circuit, and comprising:
with the cell connector, detecting in real time whether an anode of a cell is in contact and generating an anode contact signal, detecting in real time whether a cathode of the cell is in contact and generating a cathode contact signal, detecting an electric quantity of the cell in real time and generating an electric quantity signal, and sending the anode contact signal, the cathode contact signal and the electric quantity signal to the first controller;
with the first controller, sending the anode contact signal, the cathode contact signal and the electric quantity signal to the second controller;
with the first controller, sending a charging request signal to the second controller if the charging request signal sent by the charging adapter is received;
with the second controller, sending a start instruction to the first controller, if the charging request signal is received, it is determined the anode of the cell is well contacted according to the anode contact signal, it is determined that the cathode of the cell is well contacted according to the cathode contact signal, and it is determined that a voltage of the cell does not exceed a voltage threshold according to the electric quantity signal;
with the first controller, sending a connection instruction to the switch circuit if the start instruction is received;
with the switch circuit, connecting a cell terminal with a charging terminal if the connection instruction sent by the first controller is received, such that the charging adapter charges the cell.

16. The detection method for starting charging according to claim 15, wherein, the detection circuit for starting charging further comprises an anti-reverse circuit, and the detection method for starting charging further comprises:
with the anti-reverse circuit, sending a second switch-off instruction to the switch circuit, if a ground signal is coupled to the high-level charging input terminal and a power signal is coupled to the low-level charging input terminal;
with the switch circuit, disconnecting the cell terminal from the charging terminal if the second switch-off instruction is received, so as to disconnect a charging circuit for the charging adapter to charge the cell.

17. The detection method for starting charging according to claim 15, wherein,
the charging adapter comprises a third controller;
the detection method for starting charging comprises:
with the third controller, sending the charging request signal to the first controller if a second USB interface of the charging adapter is insertion-connected to a first USB interface of a mobile terminal, and with the third controller, asking the first controller whether there is a need to perform current charging on the cell via the charging request signal.

18. The detection method for starting charging according to claim 15, further comprising:
with the switch circuit, disconnecting the charging terminal from the cell terminal when receiving a first switch-off instruction sent by the first controller, so as to control the charging adapter to stop charging the cell.

19. The detection method for starting charging according to claim 15, further comprising:
with the second controller, sending a not-start instruction to the first controller after receiving the charging request signal, if it is determined that the anode of the cell is not well contacted according to the anode contact signal, or it is determined that the cathode of the cell is not well contacted according to the cathode contact signal, or it is determined that the voltage of the cell exceeds the voltage threshold according to the electric quantity signal;
with the first controller, receiving the not-start instruction and sending the first switch-off instruction to the switch circuit; and
with the switch circuit, disconnecting the cell terminal from the charging terminal.

20. The detection method for starting charging according to claim 15, further comprising:
with the switch circuit, keeping disconnection state between the cell terminal and the charging terminal, if the anode of the cell is not well contacted, or the cathode of the cell is not well contacted, or the voltage of the cell exceeds the voltage threshold.

* * * * *